United States Patent [19]
Lewis

[11] 3,848,932
[45] Nov. 19, 1974

[54] VEHICLE BRAKING SYSTEMS HAVING HEIGHT SENSING PROPORTIONING VALVE

[75] Inventor: Richard L. Lewis, South Bend, Ind.

[73] Assignee: The Bendix Corporation, South Bend, Ind.

[22] Filed: July 2, 1973

[21] Appl. No.: 375,421

[52] U.S. Cl. ............ 303/6 C, 188/106 P, 188/195, 188/349, 303/13, 303/22 R, 303/84 A
[51] Int. Cl. ...................... B60t 11/34, B60t 17/22
[58] Field of Search ............ 303/6 C, 84, 22, 2, 13; 188/349, 151 A, 195, 106 P

[56] References Cited
UNITED STATES PATENTS

| | | | |
|---|---|---|---|
| 3,475,059 | 10/1969 | Klein | 303/6 C |
| 3,617,096 | 11/1971 | Grabb et al. | 303/2 |
| 3,700,286 | 10/1972 | Bueler | 303/6 C |

Primary Examiner—Trygve M. Blix
Assistant Examiner—D. C. Butler
Attorney, Agent, or Firm—Ken C. Decker; William N. Antonis

[57] ABSTRACT

A combination valve for a vehicle hydraulic braking system having two separate fluid circuits is disclosed which includes a proportioning valve in one of the circuits and a pressure differential responsive piston for opening the proportioning valve during a pressure differential between the circuits. The proportioning valve and differential pressure responsive piston are both mounted in a single housing, but the pressure differential piston is normally disposed in the normal or neutral position out of engagement with the proportioning valve when equal fluid pressures are available in both of the hydraulic circuits. However, when pressure is available in the circuit in which the proportioning valve is provided during a failure of fluid pressure in the other fluid circuit, the pressure differential responsive piston shifts to a position engaging one of the proportioning valve members to hold the proportioning valve open, thereby permitting unrestricted fluid communication in the corresponding circuit. A hydraulic braking circuit is disclosed which uses a pair of the aforementioned combination valves including a height sensing feature to proportion fluid communication to the rear wheel brakes of the vehicle in accordance with roll of the vehicle body about the longitudinal axis thereof. Another system is disclosed which uses a pair of the aforementioned combination valves to control fluid communication to disc brakes having tandem actuators, so that flow is proportioned in the normal manner when fluid pressure is available to both fluid circuits actuating a tandem actuator, but upon failure of one of the circuits, unrestricted flow is provided through the other circuit thus enhancing the failsafe feature of this type of system.

8 Claims, 3 Drawing Figures 3,848,932

VEHICLE BRAKING SYSTEMS HAVING HEIGHT SENSING PROPORTIONING VALVE

BACKGROUND OF THE INVENTION

This invention relates to a combination valve for use in a vehicle hydraulic braking system. It further relates to a system using this type of valve.

In order to compensate for the inherent imbalance between front and rear braking pressures in automotive vehicles, it has become customary in recent years to provide a proportioning valve which restricts fluid communication to the rear wheel brakes after a predetermined pressure level is generated. More recently, it has become common to provide a so-called combination valve, in which a pressure differential warning switch is mounted in a common housing with the proportioning valve, and which obviates the effect of the proportioning valve during a failure in one of the vehicle's fluid circuits. Most combination valves to date have either been of the type in which a separate passage is opened to bypass around the proportioning valve upon failure of one of the brake circuits, or of the type in which one of the proportioning valve members is mounted directly on the pressure differential responsive means. In prior art combination valves, it has been difficult, because of the inherent limitations of the latter, to make the proportioning valve responsive to the height of the vehicle body with respect to the rear axle to adjust the amount of fluid pressure communication to the rear brakes accordingly. Such a valve has advantages over other valves which are not height sensing, since by making the valve height sensing it is also responsive to the load carried by the rear axle. It is desirable to communicate a higher fluid pressure level when the vehicle is carrying a relative heavy load than it is when the vehicle is lightly loaded.

SUMMARY OF THE INVENTION

Therefore, an important object of my invention is to provide a combination valve in which it is relatively easy to enable the proportioning valve to be load or height sensing.

Another important object of my invention is to provide a vehicle hydraulic braking system which compensates for roll of vehicle about the longitudinal axis thereof during a brake actuation.

Still another important object of my invention is to provide a hydraulic braking system using brakes having tandem actuators which are actuated by the fluid pressure in separate hydraulic systems, and to provide proportioning valves which, when both circuits function normally, proportion fluid communication to the corresponding brakes, and when one of the circuits malfunctions permits uninhibited fluid communication through the other circuit to the corresponding brake.

DETAILED DESCRIPTION

Figure 1:
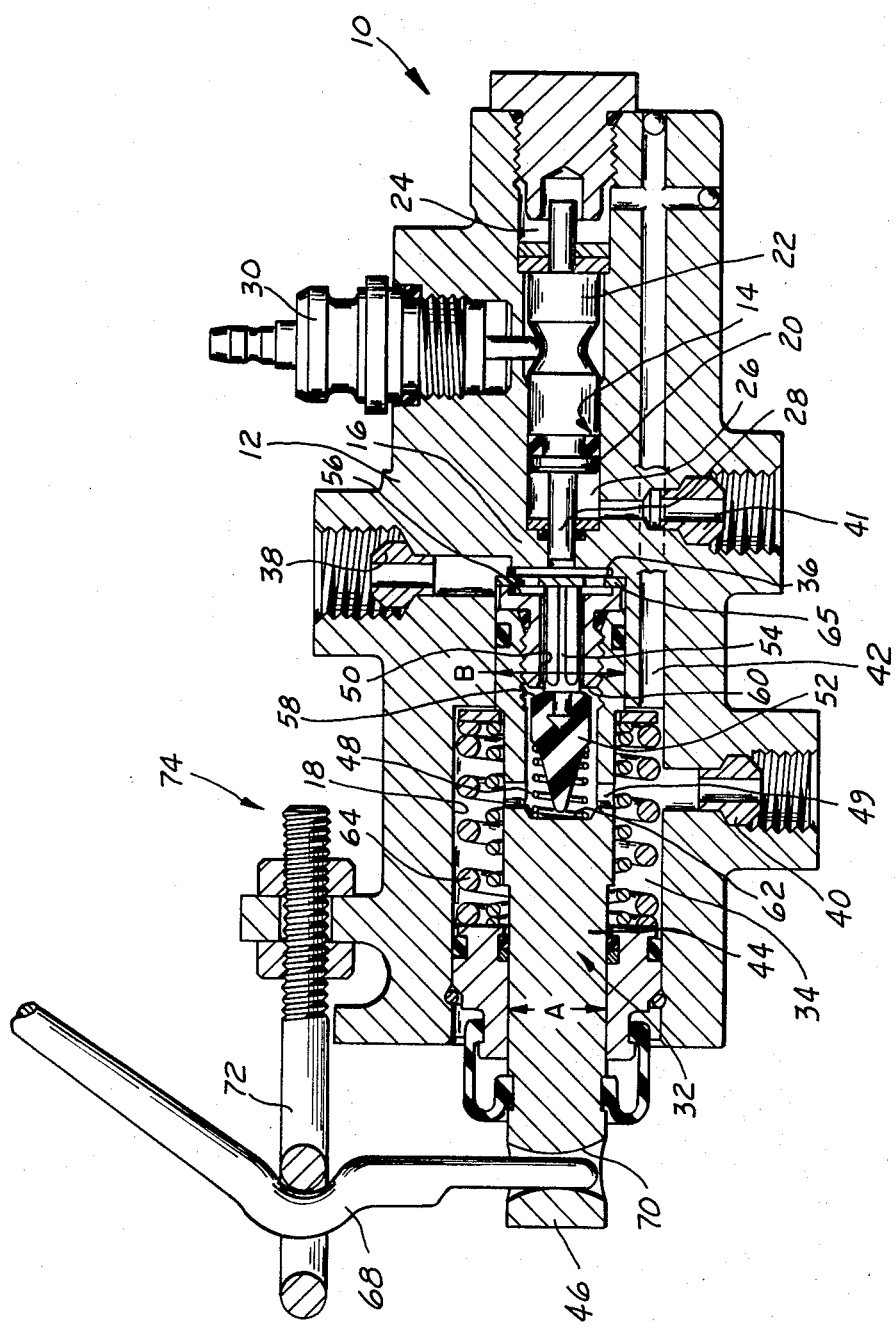
FIG. 1 is a longitudinal cross-sectional view of a combination valve made pursuant to the teachings of my present invention.

Referring now to FIG. 1 of the drawing, a combination valve generally indicated by the numeral 10 includes a housing 12 defining a bore 14 therewithin. A transverse wall 16 divides the bore 14 into a first compartment 18 and a second compartment 20. A pressure differential responsive piston 22 is slidably mounted in the compartment 20, and defines a first fluid cavity 24 between one end of piston 22 and the corresponding end of the housing 12 and a second fluid receiving cavity 26 between the opposite end of the piston 22 and the transverse wall 16. A member 28 extends from the piston 22 and is slidably and sealingly received within an opening extending through the transverse wall 16. A conventional switch 30 may be provided which is responsive to shifting of the piston 22 to provide a warning to the vehicle operator that one of the vehicle's hydraulic circuits has failed.

The proportioning valve members generally indicated by the numeral 32 are mounted in the compartment 18 and divide the latter into an inlet chamber 34 and an outlet chamber 36. An outle port 38 communicates the outlet chamber 36 with at least one brake of the vehicle. A split system master cylinder (not shown in FIG. 1) generates braking pressure in two separate hydraulic circuits. An inlet port 40 communicates one of the circuits with the inlet chamber 34 and a passage 42 communicates the chamber 34, and therefore, the inlet port 40, to the cavity 24. The cavity 26 is communicated to the other fluid pressure circuit through inlet port 41.

The proportioning valve 32 includes a piston 44 which includes an end extending from the compartment 18 as at 56, and which defines a fluid compartment 48 therewithin communicated to inlet chamber 34 and to the outlet chamber 36 through passagus 49 and 50, respectively. A resilient poppet member 52 is slidably disposed within the chamber 48, and is provided with a fluted stem 54 which extends through the passage 50. The length of the fluted stem 54 is longer than that of the passage 50, so that, when the end 56 of the piston 44 is urged against the transverse wall 16, the seating area 58 on the poppet member 52 will be held away from the seating area 60 which circumscribes the passage 50. A light spring 62 yieldably urges the poppet 52 toward the right viewing the Figure, so that the fluted stem 54 is urged toward the transverse wall 16. The relatively heavy spring 64 yieldably urges the end 56 of the piston 44 to the right viewing FIG. 1 toward the transverse wall 16. A perforated washer 64 is disposed between the end 56 of the piston 44 and the transverse wall 16, and also engages the end of the fluted stem 54.

One end of a bar 68 engages an opening 70 in the end 46 of the piston 44, and the other end of the bar 68 is operatively connected to the corresponding vehicle axle. The bar 68 is pivoted on a support 72 carried by the housing 12, which is provided with means generally indicated by the numeral 74 for adjusting the position of the support 72 axially along the housing 12. Since the valve 10 is normally mounted on the vehicle's body, the position of the bar 68 is indicative of the height of the body above the axle, and is therefore also indicative of the load carried by the particular axle. As the bar moves, it will be noted that the force exerted on the piston 44 will vary, and therefore, the effectiveness of the spring 64 will change.

In operation, assuming that the aforementioned master cylinder (not shown in FIG. 1) generates equal fluid pressure in the separate hydraulic braking circuits, substantially equal fluid pressures will be communicated to the ports 40 and 41. Since the inlet port 40 is communicated to the cavity 24 through the passage 42, substantially equal fluid pressures will act on opposite ends of the pressure differential piston 22, thereby holding it in the position illustrated in the drawing. Fluid communicated to the inlet port 40 communicates into a chamber 34. Since the springs 64 initially urge the end 56 of the piston 44 toward the wall 16, the poppet 52 will be disposed out of sealing engagement with the seating area 60, thereby permitting the fluid pressure communicated into the inlet chamber 34 to communicate through the bore 50 to the outlet port 38. Although the pressure levels in the inlet chamber 34 and outlet chamber 38 will initially be equal, the forces acting upon the piston 44 are unequal, since the fluid pressure level in the inlet chamber 34 acts across the area A, while the fluid pressure level acting upon the end 56 of the piston 44 acts across the larger diameter area illustrated in FIG. 1. Due to the unequal areas, a net force urging the piston 44 to the left viewing FIG. 1 will be generated, even though the pressure in the inlet and outlet chambers are equal. When this force differential is sufficient to overcome the force of the springs 64, the piston 44 moves to the left viewing the FIG. 1, relative to the poppet member 52, while the spring 62 maintains the end of the stem 54 in engagement with the wall 16. As the piston moves, the seating area 60 sealingly engages the seating area 58 on the poppet 52 thereby preventing fluid communication through the passage 50. As described hereinabove, the force due to the springs 64 which acts on the piston 44 is varied due to the loading on the bar 68. For example, in a lightly loaded vehicle, the bar 68 provides a force acting generally to the left viewing the Figure, in opposition to the force exerted by the spring 64, and therefore the force differential across the piston 44 needed to overcome the force of the spring 64 will be less than the force required for a heavily loaded vehicle, since the heavily loaded vehicle urges the bar 68 to a position in which the full force of the springs 64 is permitted to bear against piston 44. In any event, whenever this force differential is sufficient to overcome the spring 64 and to move the seating areas 60 and 58 into sealing engagement with one another further communication between the chambers 34 and 38 is temporarily suspended. However, if the fluid pressure level in the inlet chamber 34 is increased by an incremental amount, the valve will be opened, again permitting fluid communication into the oulet chamber. However, only a portion of the increased fluid pressure will be communicated into the outlet chamber, due to the area differential across the piston, and the valve will reclose. Therefore, once the force of the spring 64 is initially overcome the valve 32 proportions fluid communication between the port 40 and outlet port 38 so that the pressure level at the outlet port 38 is in a predetermined ratio with the pressure level at the inlet port 40.

However, if a malfunction should occur in the fluid circuit communicated to the inlet port 41, it is desirable to obviate this proportioning effect of the valve 32, since it would then be desirable to communicate the maximum possible breaking force to the brake actuators communicated with the outlet port 38. Therefore, when the circuit communicated to the inlet port 41 fails, the fluid pressure level in the cavity 26 is reduced, and the fluid pressure remaining in the cavity 24 urges the piston 22 to the left viewing FIG. 1, actuating the switch 30 and also driving the washer 66 into engagement with the end 56 of piston 44. Since the end of the fluted stem 54 also is engaged with the washer 66, and since the length of the fluted stem is longer than that of the bore 50, as long as the washer 56 is held into engagement with the end 56 of the piston 44, the seating area 58 will be held away from the seating area 60, thereby permitting substantially unrestricted fluid communication between the inlet port 40 and the outlet port 38 regardless of the pressure levels in the respective inlet and outlet chambers.

Figure 2:
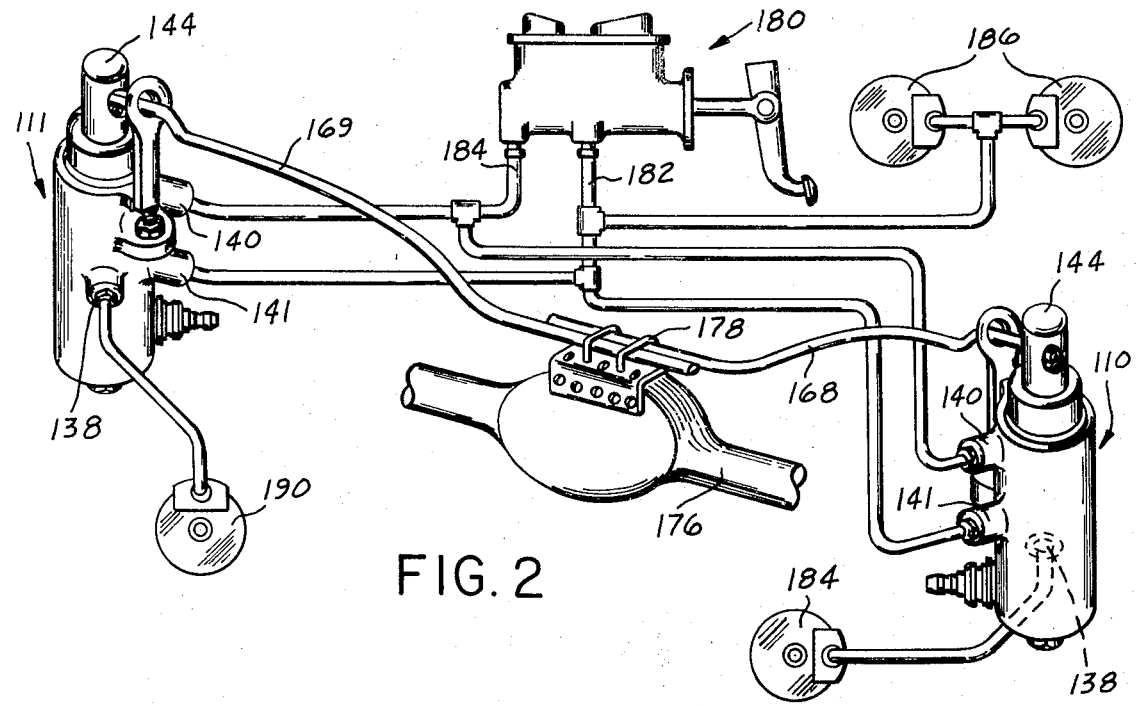
FIG. 2 is a schematic illustration of a hydraulic brake actuating system which uses the valve illustrated in FIG. 1.

Referring now to FIG. 2, elements substantially the same as those in FIG. 1 retain the same reference character, but are increased by 100. In FIG. 2, a pair of valves 110, 111 are mounted on opposite sides of the vehicle body. Each of the valves 110, 111 are identical to the valve 10 in FIG. 1. Leaf springs or bars, 168, 169 interconnect the pistons 144 of the valves 110, 111, with the axle 176 of the vehicle. Appropriate mechanisms generally indicated by the numeral 178 are provided to adjust the length and spring rate of the bars 168, 169. A split system master cylinder generally indicated by the numeral 180 is provided, and is adapted to be actuated by the vehicle operator in the normal manner. When the master cylinder 180 is actuated, substantially equal fluid pressure levels are generated in fluid circuits 182, 184. The fluid circuit 182 is communicated to the front wheel brakes 186 of the vehicle, to the inlet ports 141 of the valves 110, and 111. Fluid circuit 184 is communicated to the inlet ports 140 of the valve 110, 111. The outlet port 138 of the valve 110 is communicated to the rear wheel brake 184 mounted on the right hand side of the axle 176. The outlet port 138 of the valve 111 is communicated to the brake 190 which is mounted on the left hand side of the axle 176. It will therefore be noted that since the bars 168 and 169 will adjust the force exerted by the spring 64 on the pistons 144 of the valves 110 and 111, the force at which the valves 110 and 111 initially began to reduce brake pressure to the brakes 188 and 190 will be dependent upon the load carried by the axle 176. Furthermore, since the valves 110 and 111 are mounted on the opposite sides of the vehicle, the valves 110 and 111 can also compensate for roll of the vehicle about a longitudinal axis thereof during braking. For example, if the vehicle rolls clockwise about the axle 176, weight will be transferred to the right hand side of the vehicle and therefore the valve 110 will not begin its proportioning action until a greater fluid pressure level is attained in the hydraulic circuit 184. On the other hand, assuming a clockwise roll of the vehicle about the axis 176, the weight carried by the brake on the left hand side of the axle 176 will be reduced, thereby also reducing the point at which the valve 111 begins its proportioning action, and therefore the braking pressure to the brake 190 will be proportioned at a relatively low fluid pressure level. This relatively low fluid pressure level prevents the brake 190 from locking, thereby preventing a dangerous skid, while the increased fluid pressure level communicated by the valve 110 permits the brake 188 to generate its full braking effectiveness for the heavier weight carried by the corresponding wheel. In case of a failure in either of the circuits 182 or 184, the valve 110 or 111 will be held open by the differential pressure piston 22, thereby permitting full effectiveness of the unaffected brake 188 or 190 to be achieved.

Figure 3:
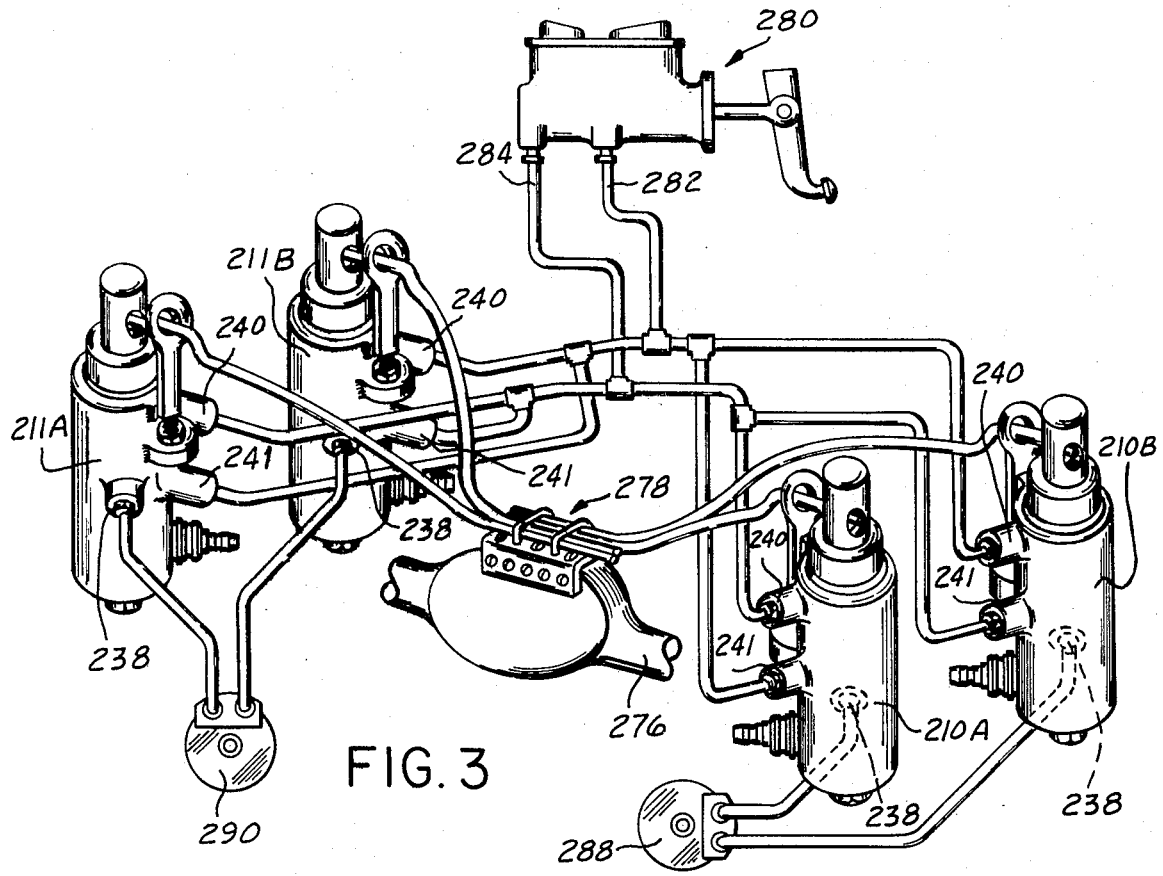
FIG. 3 is a schematic illustration similar to FIG. 2, but illustrating a different braking system.

Referring now to the braking system disclosed in FIG. 3, elements substantially the same as those in FIGS. 1 and 2 retain the same reference character, but are increased by 200. The system of FIG. 3 is identical to that of FIG. 2, except that the disc brakes 288 and 290 are provided with tandem actuators of the type disclosed in U.S. Patent application Ser. No. 136,470 filed Apr. 22, 1971, now U.S. Pat. No. 3,724,616 owned by the assignee of the present invention and incorporated herein by reference. These tandem actuators permit the same brake to be actuated by either of the vehicle's hydraulic systems. Since tandem actuators are provided, a total of two valves must be provided on each side of the vehicle in order to control fluid communication to the brakes. Therefore, the fluid circuit 282 is communicated to inlet port 240 on valve 210B and to port 240 on valve 211B, to port 241 on valve 210A and to port 241 on valve 211A. Similarly, the fluid circuit 284 is communicated to inlet port 240 on valve 210A and 240 on valve 211A, to port 241 on valve 210B and to port 241 on valve 211B. The outlet port 238 of valve 210B is communicated to one of the fluid actuators of the brake 288, and the outlet port 238 of the valve 210A is communicated to the other fluid actuator of the brake 288. Similarly, the outlet port 238 of valve 211A is communicated to one of the actuators on brake 290, while outlet port 238 of valve 211B is communicated to the other actuator of the brake 290.

The system of FIG. 3 operates in much the same way as does the system of FIG. 2, in operating to proportion fluid communication to the actuators of the brake 288 and 290 to compensate for the load carried by the axle 276 and to compensate for roll of the vehicle about the longitudinal axis thereof during braking. It will be noted that since the valves 210A and 210B are located very close to one another on the vehicle body, and similarly, valves 211A and 211B are also located very close to each other on the side of the vehicle opposite the valves 210A and 210B, the degree of proportioning action of the two valves mounted on the same side of the vehicle will be almost identical so that substantially equal fluid pressure will be delivered to the brakes 288 and 290. It will also be noted that since the fluid pressure of the other fluid circuit is communicated to the inlet ports 241 of each of the valves, that in case of failure of one of the fluid circuits 282 or 284, the valve 210A or B and 211A or B opens to permit substantially unimpeded fluid communication through the remaining circuit, due to the action of the differential pressure responsive piston 22 as described hereinabove. Therefore, even if failure of one of the circuits 282 or 284 should interrupt fluid communication to one of the actuators on the brake 288, 290, the other actuator will provide the unimpeded fluid pressure generated by the master cylinder.

I claim:
1. In a brake control valve:
   a housing defining a bore therewithin;
   means dividing said bore into first and second compartments;
   one of said compartments having a first inlet port communicated to a first pressure source, an outlet port, and valve means for controlling fluid communication between said first inlet port and said outlet port, said valve means being responsive to a first fluid pressure level at said outlet port to restrict fluid communication between said first inlet port and said outlet port to establish a lower fluid pressure level at said outlet port than at said first inlet port; and
   pressure differential responsive means mounted in the other compartment and defining a pair of fluid cavities between opposite ends of each of the pressure differential responsive means and corresponding ends of said other compartment, means communicating one of said cavities with said first inlet port and the other cavity with a second fluid pressure source, the pressure level generated by said second fluid pressure source normally being substantially equal to the pressure level generated by said first pressure source to hold said pressure differential responsive means in a normal position, said pressure differential responsive means shifting in response to the fluid pressure level at said first inlet port upon failure of fluid pressure at said second inlet port to another position, said pressure differential responsive means carrying means disposed out of engagement with said valve means when the pressure differential responsive means is disposed in the normal position, but engaging said valve means to hold the latter open to permit substantially unrestricted fluid communication between said first inlet port and said outlet port when said pressure differential responsive means is shifted to the another position;
   said means dividing said bore into said compartments being a wall extending transversely across said bore;
   said valve means including a pair of valve members cooperating with one another to control fluid communication between said first inlet port and said outlet port;
   said means carried by said pressure differential responsive means being independent of said valve members disengaged from the latter when the differential pressure responsive means is disposed in said normal position, but moving into engagement with one of said valve members to hold the latter away from the other valve member when said differential pressure responsive means shifts to said another position.

2. The invention of claim 1:
   said one valve member including a stem, the end of said stem engaging said transverse wall to limit movement of said one valve member toward said wall;
   resilient means yieldably urging one end of the other valve member toward said wall, said other valve member being responsive to the force of fluid pressure at said outlet acting on said one end of said other member sufficient to overcome and resilient means to urge said other member away from said wall relative to the one member until the other member engages the one member to restrict fluid communication to said outlet port;
   said means carried by said pressure differential responsive means holding said other valve member for movement with said one valve member to thereby prevent sealing engagement of said valve members.

3. The invention of claim 2; and
a washer disposed between said wall and said one end of said other valve member and engaging said stem;

said means carried by said pressure differential responsive means urging said washer against said one end of the other valve member when the pressure differential responsive means is shifted to said another position.

4. The invention of claim 3; and
means operably connected to said other valve member to vary the force exerted on said one valve member by said resilient means.

5. In a vehicle having a body and an axle supporting said body;
a pair of wheels rotatable on said axle, a pair of fluid pressure actuated brakes, one brake for each of said wheels, brake pressure generating means for generating substantially equal fluid pressure levels in a pair of separate fluid circuits, each of said circuits being connected to a corresponding brake for actuating the latter, a pair of valve means, one for each of said circuits, permitting uninhibited fluid communication to their corresponding brake until a first fluid pressure level is attained and thereafter restricting fluid communication to their corresponding brake until a first fluid pressure level is attained and thereafter restricting fluid communication to its corresponding brake to produce a proportionally lower fluid pressure level at said corresponding brake than the fluid pressure level generated by said pressure generating means, said valve means being mounted on opposite sides of said vehicle, and means operatively connected to each of said valve means, said vehicle, and said axle for varying said first pressure level in accordance with the distance between the vehicle body and said axle on the side of the vehicle upon which valve means is mounted whereby the fluid pressure level is varied to compensate for roll of the vehicle about the longitudinal axis thereof.

6. The invention of claim 5:
said valve means including a housing, valve members within said housing for controlling fluid communication in the corresponding circuit communicating with the corresponding brake, pressure differential responsive means for comparing the fluid pressure level in the corresponding circuit and the fluid pressure level in the other circuit and holding said valve members open to permit uninhibited fluid communication to said corresponding brake when the fluid pressure level in the other circuit is less than the fluid pressure in the corresponding circuit, by a predetermined magnitude.

7. The invention of claim 5:
each of said brakes including a pair of fluid responsive actuators, one of said actuators being communicated with a corresponding one of said circuits, the other actuator being communicated with the other circuit, there being two of said valve means for each of said brakes, one valve means for each being communicated to said one circuit and the other valve means being communicated to the other circuit, said valve mean including pressure differential responsive means for comparing the fluid pressure levels in said circuit and holding said valve means open to permit substantially uninhibited fluid communication through the corresponding circuit when the fluid pressure in the other circuit is less than the fluid pressure in the corresponding circuit by a predetermined magnitude.

8. In a vehicle having a body and an axle supporting said body:
a wheel rotatable of said axle, a brake for controlling said wheel having a pair of separate fluid pressure responsive actuators for actuating said brake, brake pressure generating means for generating substantially equal fluid pressure levels in a pair of separate fluid circuits, each of said circuits being connected to a corresponding one of said actuators, valve means in each of said circuits permitting uninhibited fluid communication through their corresponding circuits to their corresponding actuators until a first fluid pressure level is attained and thereafter restricting fluid communication to its corresponding actuator to produce a proportionally lower fluid pressure level at said corresponding actuator than the fluid pressure level generated by said pressure generating means, each of said valve means including pressure differential responsive means for comparing the fluid pressure levels in the corresponding circuit with the fluid pressure in the other circuit and holding said valve means open to permit uninhibited fluid communication to the corresponding actuator when the fluid pressure level in the other circuit exceeds the fluid pressure level in the one circuit by a predetermined magnitude.

* * * * *